United States Patent
Sawada et al.

(10) Patent No.: US 11,923,573 B2
(45) Date of Patent: Mar. 5, 2024

(54) FREIGHT VEHICLE

(71) Applicants: TOYOTA JIDOSHA KABUSHIKI KAISHA, Toyota (JP); HINO MOTORS, LTD., Hino (JP)

(72) Inventors: Yutaka Sawada, Nagakute (JP); Yukihide Yokoyama, Toyota (JP); Yuichi Yagami, Kuwana (JP)

(73) Assignees: TOYOTA JIDOSHA KABUSHIKI KAISHA, Toyota (JP); HINO MOTORS, LTD., Hino (JP)

( * ) Notice: Subject to any disclaimer, the term of this patent is extended or adjusted under 35 U.S.C. 154(b) by 671 days.

(21) Appl. No.: 17/088,196

(22) Filed: Nov. 3, 2020

(65) Prior Publication Data

US 2021/0135255 A1 May 6, 2021

(30) Foreign Application Priority Data

Nov. 5, 2019 (JP) .................................. 2019-200652

(51) Int. Cl.
| | |
|---|---|
| H01M 8/04014 | (2016.01) |
| B60L 1/00 | (2006.01) |
| B60L 50/71 | (2019.01) |
| H01M 8/04007 | (2016.01) |
| H01M 8/04082 | (2016.01) |
| H01M 8/0432 | (2016.01) |
| H01M 8/04701 | (2016.01) |

(52) U.S. Cl.
CPC ......... *H01M 8/04074* (2013.01); *B60L 1/003* (2013.01); *B60L 50/71* (2019.02); *H01M 8/04014* (2013.01); *H01M 8/04201* (2013.01); *H01M 8/04365* (2013.01); *H01M 8/04708* (2013.01); *H01M 2250/20* (2013.01)

(58) Field of Classification Search
CPC ......... H01M 8/04074; H01M 8/04014; H01M 8/04201; H01M 8/04365; H01M 8/04708; H01M 2250/20; B60L 50/71; B60L 1/003
See application file for complete search history.

(56) References Cited

U.S. PATENT DOCUMENTS

| | | | |
|---|---|---|---|
| 7,966,945 B1 * | 6/2011 | Miller | B61C 7/04 105/49 |
| 8,685,586 B2 * | 4/2014 | Inui | H01M 8/2483 429/465 |
| 10,518,652 B2 * | 12/2019 | Brown | B60L 1/003 |

(Continued)

FOREIGN PATENT DOCUMENTS

| | | |
|---|---|---|
| JP | 2005044551 A | 2/2005 |
| JP | 2006248437 A | 9/2006 |

(Continued)

*Primary Examiner* — John D Walters
(74) *Attorney, Agent, or Firm* — Hunton Andrews Kurth LLP

(57) ABSTRACT

A freight vehicle has a loading space, on which freight is loaded, rearward of a vehicle cabin in which an occupant rides. The freight vehicle includes a fuel cell mounted below the vehicle cabin and functioning as an electric power source, a storage portion disposed between the vehicle cabin and the loading space, and a tank disposed in the storage portion and stores fuel gas that is supplied to the fuel cell, and a radiator installed in the storage portion and performs heat exchange between air and a coolant that is supplied to the fuel cell.

3 Claims, 13 Drawing Sheets

(56) References Cited

U.S. PATENT DOCUMENTS

2015/0372322 A1* 12/2015 Shimoyana .......... B60K 15/063
429/515
2018/0339604 A1 11/2018 Brown et al.

FOREIGN PATENT DOCUMENTS

JP          2017128202 A     7/2017
WO      2014123040 A1    8/2014

* cited by examiner

FREIGHT VEHICLE

INCORPORATION BY REFERENCE

The disclosure of Japanese Patent Application No. 2019-200652 filed on Nov. 5, 2019 including the specification, drawings and abstract is incorporated herein by reference in its entirety.

BACKGROUND

1. Technical Field

The present disclosure relates to a freight vehicle equipped with a fuel cell.

2. Description of Related Art

A vehicle is usually provided with a radiator for exchanging heat between a coolant and air in order to adjust a temperature of a heat source. For example, a truck disclosed in Japanese Unexamined Patent Application Publication No. 2006-248437 (JP 2006-248437 A) has a radiator provided in an engine compartment, which exchanges heat between a coolant of an engine and air. Besides the radiator used in a vehicle equipped with such an internal combustion engine, there is also a radiator used in a fuel cell vehicle equipped with a fuel cell as an electric power source. In the fuel cell vehicle, the radiator may be used for heat exchange between the coolant supplied to the fuel cell and air.

SUMMARY

In the freight vehicle such as a truck disclosed in JP 2006-248437 A, a large space is usually required for loading the freight, so that a space for mounting drive system devices is limited as compared with a general passenger car. When such a freight vehicle is equipped with a fuel cell as an electric power source, it is necessary to make efficient use of the limited space to mount devices that constitute the fuel cell system, such as a tank that stores fuel gas that is supplied to the fuel cell and the radiator described above, in addition to the fuel cell. In particular, the radiator is required to be installed in a location where heat exchange efficiency with the coolant can be secured even in such a limited place. As described above, in the freight vehicle configured as a fuel cell vehicle, there is still room for improvement in the installation location of the devices that constitute the fuel cell system.

The technology of the present disclosure can be implemented as the following aspects.

An aspect of the present disclosure provides a freight vehicle having a loading space, on which freight is loaded, rearward of a vehicle cabin in which an occupant rides. The freight vehicle includes a fuel cell mounted below the vehicle cabin and functioning as an electric power source, a storage portion disposed between the vehicle cabin and the loading space, a tank disposed in the storage portion and configured to store a fuel gas that is supplied to the fuel cell, and a radiator installed in the storage portion and configured to perform heat exchange between air and a coolant that is supplied to the fuel cell. In the freight vehicle of the above aspect, the storage portion for storing the tank is provided in a space with few limitations in terms of dimensions and a relatively high flexibility of layout between the vehicle cabin and the loading space, and the radiator is provided in the storage portion. Thereby, the space below the vehicle cabin in the freight vehicle can be used for disposing equipment for the fuel cell system other than the tank and the radiator, and the limited space in the freight vehicle can be effectively utilized. Moreover, with the storage portion provided between the vehicle cabin and the loading space, it is easy to take in air, so the heat exchange efficiency between the coolant and air in the radiator can be improved. Furthermore, since air can flow in the storage portion through the radiator, diffusion of the fuel gas that has leaked in the storage portion can be promoted. In addition, since it is possible to suppress the distance between the radiator and the fuel cell from becoming excessively long, it is possible to suppress increase in the length of a coolant pipe connecting the radiator and the fuel cell. Thus, damage or deterioration of the pipe can be suppressed.

In the freight vehicle of the above aspect, the radiator may be provided rearward of the tank. With the freight vehicle of the above aspect, it is possible to suppress increase in size of the freight vehicle in the width direction compared to a case where the radiator is provided on the side of the tank in the storage portion. Moreover, since the radiator can be provided at a position away from the vehicle cabin, it is possible to suppress heat of the coolant from being transferred from the radiator to the vehicle cabin. Furthermore, the fuel gas that has leaked in the storage portion flows out rearward from the storage portion through the radiator, so that it is possible to suppress the fuel gas from flowing into the vehicle cabin that is located forward of the storage portion.

The freight vehicle of the above aspect may further include a leakage detection unit configured to detect a leakage of the fuel gas from the tank. The radiator may have a fan that is configured to be rotated by a drive motor to control circulation of air between an inside and an outside of the storage portion. The fan may be configured to, when the leakage of the fuel gas is not detected by the leakage detection unit, rotate such that air is taken from the outside of the storage portion to the inside of the storage portion, and may be configured to, when the leakage of the fuel gas is detected by the leakage detection unit, rotate such that air is discharged from the inside of the storage portion to the outside of the storage portion. With the freight vehicle of the above aspect, driving of the fan can improve heat exchange efficiency between air and the coolant in the radiator even when no traveling wind is generated. Further, when the leakage of the fuel gas in the storage portion is detected, the fan is driven so as to promote an outflow of the fuel gas from the storage portion, so that it is possible to suppress the fuel gas from staying in the storage portion.

The freight vehicle of the above aspect may further include a temperature sensor configured to detect a surface temperature of the tank. The radiator may have a fan that is configured to be rotated by a drive motor to control circulation of air between an inside and an outside of the storage portion. The fan may be configured to, when the surface temperature of the tank that is detected by the temperature sensor is equal to or higher than a predetermined threshold temperature, rotate such that air is taken from an outside of the storage portion to an inside of the storage portion, and may be configured to, when the surface temperature of the tank is lower than the threshold temperature, rotate such that air is discharged from the inside of the storage portion to the outside of the storage portion. With the freight vehicle of the above aspect, when the surface temperature of the tank is high, the fan rotates in a direction in which air is taken into the storage portion. Therefore, heat exchange between the tank and air is promoted, so that it is possible to suppress the temperature of the tank from becoming equal to or higher than an allowable temperature. Also, when the surface temperature of the tank is low, the fan rotates in a direction in which air is discharged from the storage portion. Therefore, air that has been reduced in temperature by heat exchange with the tank can be guided to the radiator, so that it is possible to increase cooling efficiency of the coolant in the radiator.

The technology according to the present disclosure can also be implemented in various forms other than a freight vehicle. For example, the technology can be implemented in the forms of a tank storage portion including a radiator for a fuel cell, a mounting structure for the tank and the radiator in a fuel cell vehicle, and the like. The technology can also be implemented in the forms of a control device and a control method for a fan of a radiator in a fuel cell vehicle, a computer program for realizing the control method, a non-transitory storage medium storing the computer program, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. First Embodiment

Figure 1:
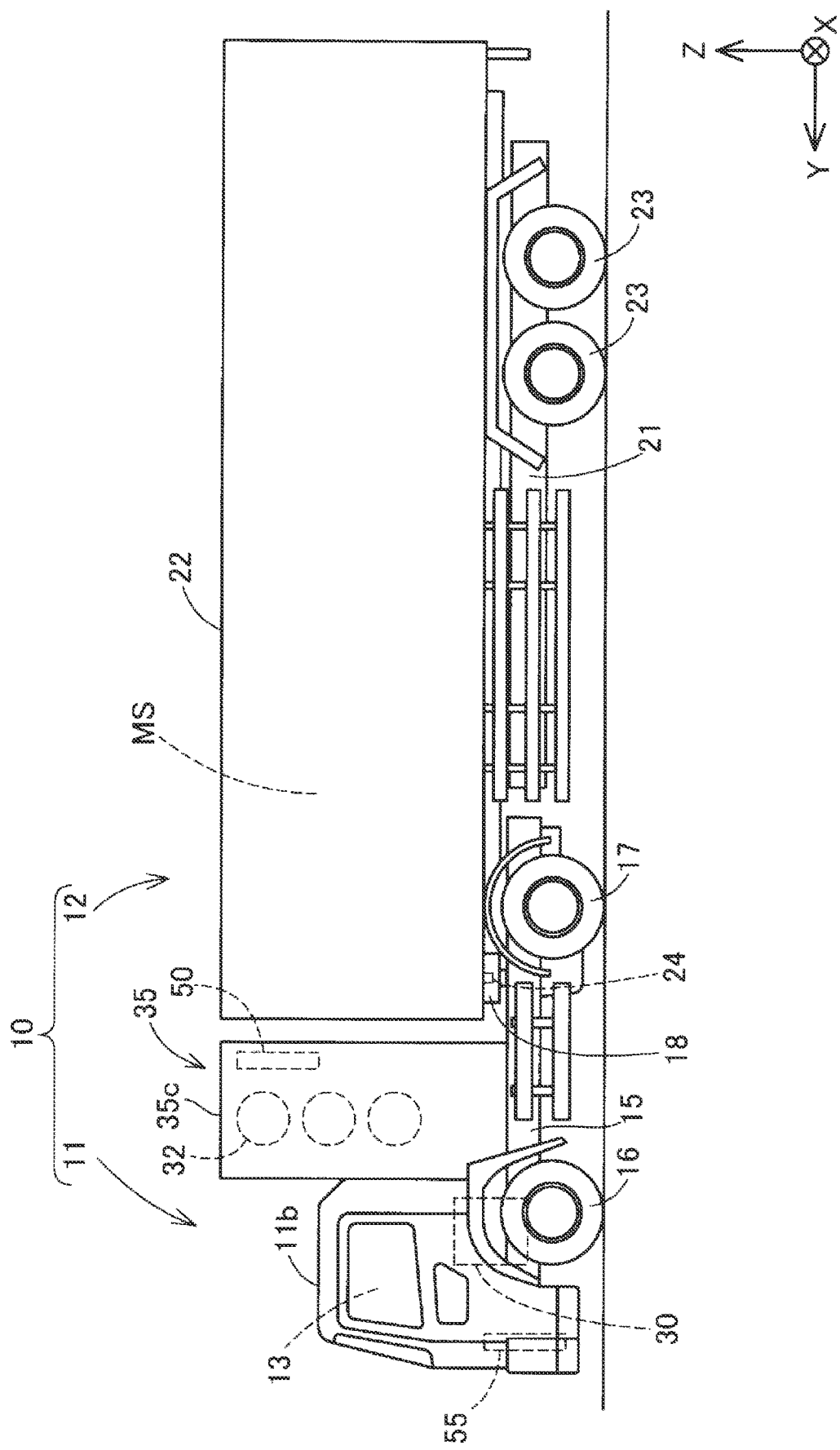
FIG. 1 is a schematic side view showing a vehicle according to a first embodiment.

FIG. 1 is a schematic side view showing a vehicle 10 according to a first embodiment. In FIG. 1, arrows indicating an X direction, a Y direction, and a Z direction that are orthogonal to each other are illustrated. The X direction corresponds to a width direction of the vehicle 10, the Y direction corresponds to a front-rear direction of the vehicle 10, and the Z direction corresponds to a height direction of the vehicle 10. The arrows indicating the X direction, the Y direction, and the Z direction are illustrated in each of the drawings referred to later so as to correspond to FIG. 1. It should be noted that the terms "front" and "rear" in the present specification mean "front" and "rear" in the front-rear direction of the vehicle 10.

The vehicle 10 is configured as a freight vehicle. In the present specification, a "freight vehicle" means a vehicle mainly intended to transport freight and having a loading space for freight rearward of a vehicle cabin. The loading space has a larger area than the vehicle cabin when viewed in the height direction. The configuration "having a loading space" includes a configuration in which a cargo room and a cargo bed can be added to form the loading space.

In the first embodiment, the vehicle 10 includes a tractor head 11 that is a towing vehicle having a vehicle cabin 13 in which occupants including a driver ride, and a trailer 12 that is a towed vehicle on which freight is loaded. In the vehicle 10, the trailer 12 is connected to the rear of the tractor head 11 to form a freight loading space MS rearward of the vehicle cabin 13. In the first embodiment, the cargo room in a container 22 described later constitutes the freight loading space MS. Thus, the tractor head 11 is configured such that the cargo room and the cargo bed can be added so as to form the loading space MS rearward of the vehicle cabin 13. Thus, according to the definition of the "freight vehicle", the tractor head 11 alone to which the trailer 12 is not connected can also be regarded as the freight vehicle.

The tractor head 11 includes a pair of vehicle frames 15 that constitute side frames that are arranged in parallel and spaced from each other in the X direction, under the vehicle cabin 13 provided inside a main body 11b. Each vehicle frame 15 is arranged along the Y direction and extends from an area below the vehicle cabin 13 rearward of the main body 11b along the Y direction.

Front wheels 16 and rear wheels 17 of the tractor head 11 are attached to the outer sides of the vehicle frames 15 in the X direction. The front wheels 16 are located under the vehicle cabin 13, and the rear wheels 17 are located near the rear end of the vehicle frames 15. The front wheels 16 are drive wheels that are connected to a driving force source (not shown) and are rotated by a driving force transmitted from the driving force source. In the present embodiment, the driving force source is composed of a motor (not shown). The rear wheels 17 are provided at the rear end of the vehicle frames 15. In the vicinity of the rear wheels 17, a connected portion 18 is provided in a central portion interposed between the vehicle frames 15. A connecting portion 24 of the trailer 12 is connected to the connected portion 18. The connected portion 18 is composed of a so-called coupler.

The trailer 12 has a chassis 21. The chassis 21 supports the container 22 from below. The container 22 includes therein a cargo room in which freight is stored. Driven wheels 23 are attached to portions of the chassis 21 near the rear end of the chassis 21. Further, the connecting portion 24 that is connected to the connected portion 18 of the tractor head 11 described above is provided at a portion of the chassis 21 near the front end of the chassis 21. The connecting portion 24 is composed of a so-called kingpin. The connecting portion 24 projects downward and is inserted into and engaged with the connected portion 18 from above. The trailer 12 is connected to the tractor head 11 while being allowed to turn in the width direction with respect to the tractor head 11.

In the first embodiment, the trailer 12 has the container 22 disposed on the chassis 21. In other embodiments, the container 22 may be omitted. In the trailer 12, instead of the container 22, a fixture for fixing the freight may be provided on the chassis 21.

The vehicle 10 is configured as a fuel cell vehicle and includes, as an electric power source, a fuel cell unit 30 including a fuel cell. The fuel cell unit 30 is a unit including a fuel cell and devices integrally attached to a fuel cell body. The "devices integrally attached to the fuel cell body" include, for example, a case for accommodating the fuel cell, a frame for supporting the fuel cell, sensors, valves, pumps, pipe connecting members, and the like.

The fuel cell unit 30 is mounted in an area below the vehicle cabin 13 inside the main body 11b of the tractor head 11. In the first embodiment, the fuel cell included in the fuel cell unit 30 is a polymer electrolyte fuel cell, and is configured as a fuel cell stack in which a plurality of unit cells are stacked. Each unit cell has a membrane electrode assembly in which electrodes are arranged on the opposite sides of an electrolyte membrane, and is an element that can generate electric power by itself. The fuel cell mounted in the vehicle 10 is not limited to the polymer electrolyte fuel cell. In other embodiments, various types of fuel cells, such as a solid oxide fuel cell, can be used as the fuel cell.

In the first embodiment, the fuel cell unit 30 includes a plurality of fuel cell stacks. Thereby, the electric power that the fuel cell unit 30 can output as the driving force of the vehicle 10 can be increased, and the weight of the freight that can be loaded on the vehicle 10 can be increased. Note that in other embodiments, the fuel cell unit 30 may have a single fuel cell stack.

In addition to the fuel cell unit 30, the vehicle 10 is equipped with various devices constituting the fuel cell system for performing power generation in the fuel cell unit 30. The various devices constituting the fuel cell system include, for example, a device for supplying a reaction gas to the fuel cell, a device for adjusting the temperature of the fuel cell, a device for controlling a voltage and a current of the fuel cell, and a control device for controlling the operation of the fuel cell system.

The vehicle 10 has, as one of such devices, tanks 32 for storing the fuel gas supplied to the fuel cell stack of the fuel cell unit 30, which is mounted in the tractor head 11. The tanks 32 store hydrogen as the fuel gas. Each tank 32 has a pressure resistance of 70 MPa or more. In the first embodiment, the vehicle 10 includes the plurality of tanks 32 in order to increase its cruising range. In the first embodiment, each tank 32 has the same dimensions. However, in other embodiments, the dimensions of each tank 32 need not be uniform.

The tank 32 has a liner that is a resin container constituting a body, and the surface of the liner is covered with a fiber-reinforced resin layer serving as a reinforcing layer. The liner may be made of a light metal such as aluminum instead of the resin member. The fiber-reinforced resin layer is formed by a filament winding method. The fiber-reinforced resin layer is composed of reinforcing fibers such as carbon-fiber-reinforced plastic (CFRP) wound around the outer surface of the liner, and a thermosetting resin that binds the reinforcing fibers together.

Each tank 32 is stored in a storage portion 35 provided between the vehicle cabin 13 and the loading space MS. In the first embodiment, the storage portion 35 is provided between the vehicle cabin 13 and the container 22. The storage portion 35 is fixed on the vehicle frames 15. The storage portion 35 includes a housing 35c composed of a hollow box, and the tanks 32 are stored inside the housing 35c. The housing 35c is made of, for example, acrylonitrile butadiene styrene (ABS) resin or fiber-reinforced plastic. In the first embodiment, the upper end of the storage portion 35 is located higher than the upper end of the main body 11b.

Although not shown in FIG. 1, in the vehicle 10, the tractor head 11 is equipped with a compressor for supplying an oxidant gas to the fuel cell stack of the fuel cell unit 30. In the present embodiment, the oxidant gas is oxygen in the air. The compressor is provided in the area below the vehicle cabin 13, takes in air flowing in from a front grille provided in the main body 11b, compresses the air, and sends the air to the fuel cell unit 30.

Although not shown in FIG. 1, the vehicle 10 has a coolant circulation unit mounted in the tractor head 11, which circulates a coolant in the fuel cell stack of the fuel cell unit 30. The coolant circulation unit includes radiators 50, 55 that exchange heat between the coolant and air, and coolant pumps that circulate the coolant between the fuel cell unit 30 and the radiators 50, 55. Although details will be described later, a first radiator 50 is provided in the storage portion 35, and a second radiator 55 is provided at the front end of the tractor head 11. The coolant pump is installed near the fuel cell unit 30.

Figure 2A:
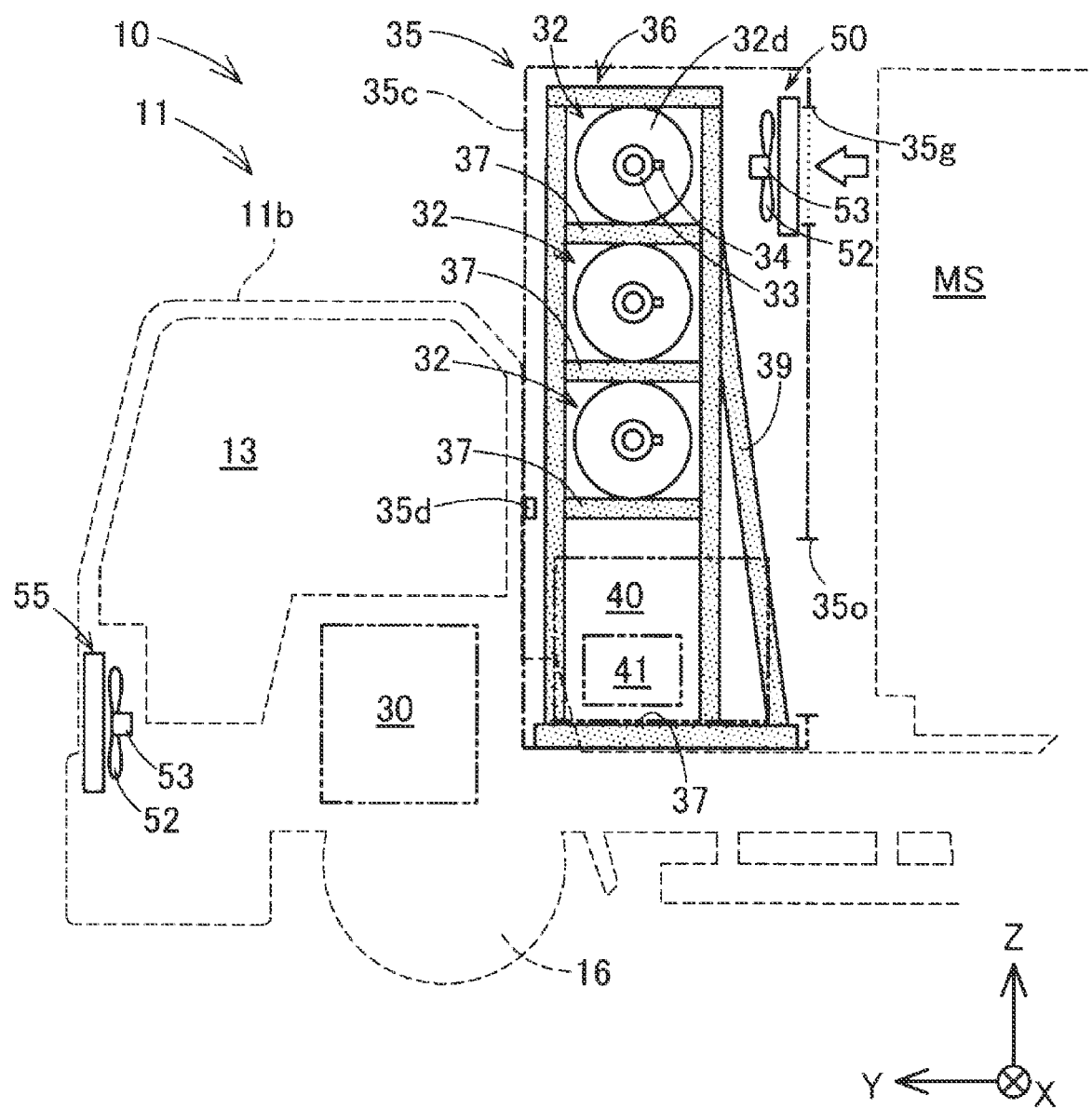
FIG. 2A is a schematic side view of a tractor head.
Figure 2B:
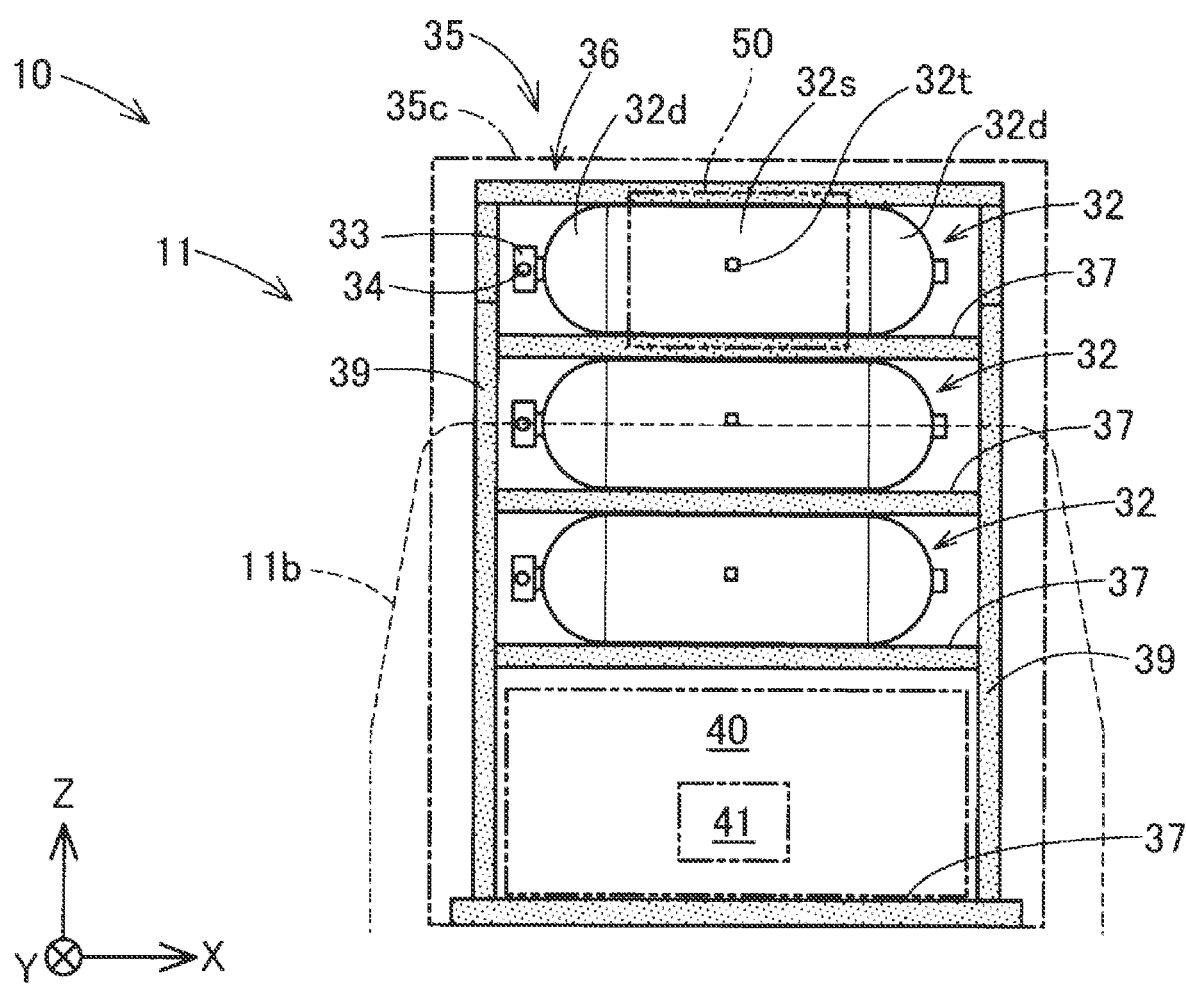
FIG. 2B is a schematic back side view of the tractor head.

With reference to FIGS. 2A and 2B, details of the configuration of the tanks 32 and details of the configuration of the storage portion 35 will be described. FIG. 2A is a schematic side view of the tractor head 11 as seen in the X direction, and FIG. 2B is a schematic back side view of the tractor head 11 as seen in the Y direction. In FIGS. 2A and 2B, the internal structure of the storage portion 35 is schematically shown. In FIGS. 2A and 2B, the housing 35c of the storage portion 35 is indicated by a long dashed short dashed line for convenience. Further, in FIG. 2A, the installation areas of the fuel cell unit 30 and system auxiliary equipment 40 described later are indicated by long dashed double-short dashed lines. Further, in FIG. 2A, the radiators 50, 55 are indicated by continuous lines, and in FIG. 2B, the installation area of the radiator 50 is indicated by a long dashed double-short dashed line.

As shown in FIG. 2B, each tank 32 has a cylindrical cylinder portion 32s and substantially hemispherical dome portions 32d provided at opposite ends of the cylinder portion 32s. As shown in FIGS. 2A and 2B, a cap 33 to which a pipe or a valve is connected is provided at the apex of one of the dome portions 32d. Although not shown, inside the cap 33, a charge flow path through which the fuel gas flows when the fuel gas is charged in the tank 32 and a supply flow path through which the fuel gas flows when the fuel gas is supplied from the tank 32 to the fuel cell unit 30 are provided.

The cap 33 of each tank 32 is provided with a fusion valve 34. The fusion valve 34 is provided so as to project from the surface of the cap 33. The fusion valve 34 is made of a metal material that melts when its temperature exceeds a predetermined temperature of, for example, about 110 degrees Celsius. The fusion valve 34 is made of, for example, an alloy of lead and tin. The fusion valve 34 is attached so as to seal a discharge path (not shown) provided in the cap 33. The discharge path branches from the above-mentioned charge flow path and extends to the outside of the cap 33. For example, when a fire occurs in the vehicle 10, the temperature of the metal material constituting the fusion valve 34 exceeds the melting point and the metal material melts. The discharge path thus communicates with the outside, so that the fuel gas inside the tank 32 is discharged through the discharge path. In the vehicle 10 of the first embodiment, the tank 32 is stored into the storage portion 35. Therefore, even when the fusion valve 34 is opened and the fuel gas is discharged from the tank 32, it is possible to suppress the fuel gas from flowing in the vehicle cabin 13.

The storage portion 35 includes a storage shelf 36 that supports the tanks 32 inside the housing 35c. The storage shelf 36 is configured by connecting a plurality of metal frame members. The storage shelf 36 is disposed in the internal space of the housing 35c so as to extend in the height direction. The storage shelf 36 has a plurality of installation portions 37 arranged side by side in the height direction of the vehicle 10. The tanks 32 are installed one by one on each installation portion 37 so that the longitudinal direction of the tanks 32 coincides with the width direction of the vehicle 10. The space between the vehicle cabin 13 and the loading space MS in the vehicle 10 has little restriction on the dimension in the height direction, so it is possible to easily secure installation spaces for the tanks 32 using the storage shelf 36 in which the tanks 32 can be arranged in multiple stages in the height direction. Further, as shown in FIG. 2B, in the first embodiment, the length of the tanks 32 in the longitudinal direction and the width of the storage portion 35 are smaller than the width of the vehicle 10. This suppresses increase in size of the vehicle 10 in the width direction due to the installation of the tanks 32 in the storage portion 35. It should be noted that the longitudinal direction of the tank 32 may be translated as a central axis direction that extends along the central axis of the tank 32.

Although FIGS. 1, 2A, and 2B show an example in which three tanks 32 are arranged side by side in the height direction, the number of the tanks 32 mounted in the vehicle 10 is not limited to three. The number of tanks 32 may be one, two, or more than three. The number of the installation portions 37 of the storage shelf 36 may be changed as appropriate in accordance with the number of the tanks 32 mounted in the vehicle 10.

In the first embodiment, the system auxiliary equipment 40 including various devices constituting the fuel cell system is installed on the lowermost installation portion 37 of the storage shelf 36. Further, the housing 35c is provided with an opening 35o that is continuous with the installation area of the system auxiliary equipment 40 at a position near the lower end of the housing 35c. The system auxiliary equipment 40 includes, for example, an electronic control unit (ECU) 41 that controls the operation of the fuel cell system. The ECU 41 includes at least one processor and a main storage device. The ECU 41 exerts various functions for controlling the operation of the fuel cell system by executing programs and commands read by the processor into the main storage device. At least part of the functions of the ECU 41 may be composed of a hardware circuit.

The system auxiliary equipment 40 stored in the storage portion 35 may include other devices in addition to the ECU 41 or instead of the ECU 41. The system auxiliary equipment 40 may include, for example, a secondary battery. In the vehicle 10 of the first embodiment, the storage portion 35 having the storage shelf 36 enables the area below the tanks 32 to be effectively utilized as the installation space for the system auxiliary equipment 40. Further, during maintenance of the system auxiliary equipment 40, an operator can easily access the system auxiliary equipment 40 through the opening 35o of the housing 35c. Note that in other embodiments, the installation space for the system auxiliary equipment 40 need not be provided in the storage portion 35.

The storage shelf 36 of the first embodiment is provided with support members 39 rearward of a storage area of the tanks 32. Each of the support members 39 is composed of a columnar member. Each of the support members 39 is disposed so as to extend obliquely from a portion on the upper end side of the storage shelf 36 to a portion of the lowermost installation portion 37, which is extended rearward. The support members 39 enhance the stability of the installation posture of the storage shelf 36 in the front-rear direction.

As shown in FIG. 2A, a concentration sensor 35d that detects the concentration of the fuel gas is provided inside the storage portion 35. The ECU 41 has a function as a leakage detection unit that detects a leakage of the fuel gas in the storage portion 35, and monitors the concentration of the fuel gas in the storage portion 35 with the concentration sensor 35d. When the concentration of the fuel gas in the storage portion 35 becomes higher than a predetermined threshold value, the ECU 41 notifies the occupant of the vehicle 10 of occurrence of the leakage of the fuel gas through a notification unit such as an indicator (not shown) provided in the vehicle cabin 13. Note that in other embodiments, the ECU 41 need not have a function as the leakage detection unit, and the concentration sensor 35d may be omitted.

As shown in FIG. 2B, a temperature sensor 32t that detects a surface temperature of the tank 32 is attached to the surface of each tank 32. The detection result of the temperature sensor 32t is transmitted to the ECU 41. The ECU 41 monitors the surface temperature of the tank 32 with the temperature sensor 32t. For example, when the temperature of the tank 32 is higher than a predetermined threshold temperature, the ECU 41 notifies the occupant of the vehicle 10 of occurrence of an abnormal temperature in the tank 32 through the notification unit such as an indicator (not shown) provided in the vehicle cabin 13. Note that in other embodiments, the temperature sensor 32t may be omitted and the ECU 41 need not monitor the surface temperature of the tank 32.

The storage portion 35 is provided with the radiator 50 that performs heat exchange between the coolant supplied to the fuel cell unit 30 and air. The radiator 50 is fixed to the housing 35c of the storage portion 35. In the first embodiment, the radiator 50 is provided at a position rearward of the tanks 32 so as to face the loading space MS. Further, the radiator 50 is provided at a position near the upper end rather than the lower end of the housing 35c. The housing 35c is provided with a radiator grille 35g, through which air flows, at such a portion that the radiator grille 35g faces the radiator 50.

The radiator 50 has a configuration in which tubes through which the coolant flows and fins are arranged in a flat plate shape, and is configured such that air can flow between the tubes and the fins in the thickness direction. The radiator 50 has a fan 52. The fan 52 is rotated by a drive motor 53 that is driven under the control of the ECU 41. In the first embodiment, after the vehicle 10 is started and the operation of the fuel cell system is started, the ECU 41 keeps rotating the fan 52 in a direction in which air outside the storage portion 35 is taken into the storage portion 35 until the operation of the fuel cell system ends. Since the radiator 50 has the fan 52, it is possible to promote the circulation of air between the inside and the outside of the storage portion 35 by driving the fan 52 even when traveling wind is not generated. Thus, the heat exchange efficiency between air and the coolant in the radiator 50 can be improved. Note that the fan 52 may be omitted in other embodiments.

Since the radiator 50 is provided in the storage portion 35, heat exchange with the coolant using the traveling wind of the vehicle 10 is facilitated. In addition, since the radiator 50 is provided in the storage portion 35 that is distanced from an engine compartment in which the fuel cell unit 30 that is a heat source is disposed, heat reception of the radiator 50 from the fuel cell unit 30 is suppressed. Therefore, the cooling efficiency of the coolant by the radiator 50 can be improved. In addition, since the radiator 50 is provided in the storage portion 35 for the tanks 32, the flow of air into the storage portion 35 through the radiator 50 can be used to promote diffusion of the fuel gas that has leaked in the storage portion 35. In addition, when the radiator 50 is provided in the storage portion 35, it is possible to suppress the distance between the radiator 50 and the fuel cell unit 30 from becoming excessively long. Therefore, it is possible to suppress increase in the length of a coolant pipe (not shown) connecting the radiator 50 and the fuel cell unit 30. Thus, damage and deterioration of the coolant pipe can be suppressed.

In the first embodiment, as described above, the radiator 50 is provided rearward of the tanks 32 in the storage portion 35. Thus, it is possible to suppress increase in size of the vehicle 10 in the width direction compared to the case where the radiator 50 is provided on the side of the tanks 32 in the storage portion 35. Further, since the radiator 50 can be distanced from the vehicle cabin 13, the heat of the coolant in the radiator 50 is suppressed from being transferred to the vehicle cabin 13. Further, even when a leakage of the fuel gas occurs in the storage portion 35, the fuel gas is suppressed from flowing into the vehicle cabin 13 through the radiator 50. In addition, since the radiator grille 35g can be provided so as to face the loading space MS where there is a relatively few shielding objects, layout of the position of the radiator grille 35g is facilitated.

In the first embodiment, the second radiator 55 is provided in the main body 11b of the tractor head 11 in addition to the first radiator 50 of the storage portion 35 described above. The second radiator 55 has almost the same configuration as the first radiator 50 except that the installation position is different. As described with reference to FIG. 1, the second radiator 55 is provided at the front end of the tractor head 11 and performs heat exchange between the coolant and air taken into the main body 11b through a front grille (not shown).

In the vehicle 10 of the first embodiment, the temperature of the coolant can be controlled by the two radiators 50, 55. Therefore, the temperature controllability of the fuel cell stacks included in the fuel cell unit 30 can be improved without increasing the size of the radiators 50, 55. Further, since the two radiators 50, 55 perform heat exchange using air taken into the different spaces of the vehicle 10, the heat exchange efficiency between air and the coolant in each radiator 50, 55 can be improved. Note that in other embodiments, the second radiator 55 in the main body 11b may be omitted.

As described above, in the vehicle 10 of the first embodiment, the tanks 32 and the radiator 50 are arranged in the space between the vehicle cabin 13 and the loading space MS with few limitations in terms of dimensions and a relatively high flexibility of layout. Thus, the limited space in the main body 11b can be used for the fuel cell unit 30 and other devices constituting the fuel cell system, and therefore the limited space in the vehicle 10 that is a freight vehicle can be effectively utilized. Moreover, with the storage portion 35 provided outside the main body 11b, it is easy to ensure the circulation of air. Thus, the heat exchange efficiency between the coolant and air in the radiator 50 can be increased, and diffusion of the fuel gas that has leaked in the storage portion 35 can be promoted. In addition, in the vehicle 10 of the first embodiment, the vehicle cabin 13 in the main body 11b and the storage portion 35 are separated from each other. Therefore, the fuel gas that has leaked in the storage portion 35 is suppressed from flowing into the vehicle cabin 13.

2. Second Embodiment

Figure 3:
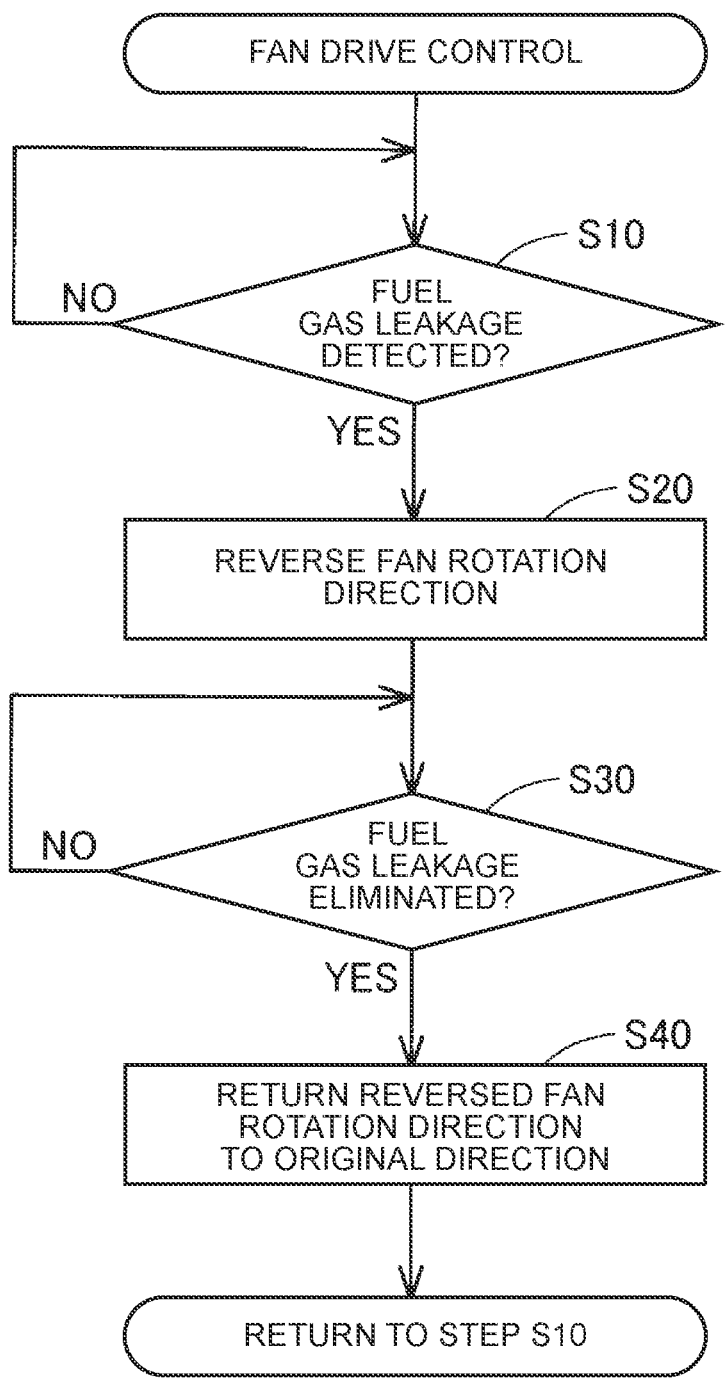
FIG. 3 is a flowchart illustrating a flow of drive control for a fan in a second embodiment.

FIG. 3 is a flowchart illustrating a flow of drive control for the fan 52 of the radiator 50, which is executed in the vehicle 10 of a second embodiment. The configuration of the vehicle 10 of the second embodiment is substantially the same as that described in the first embodiment unless otherwise specified.

In the vehicle 10, driving of the fan 52 is controlled by the ECU 41 as described in the first embodiment. When the operation of the fuel cell system is started, the ECU 41 controls the drive motor 53 to start the rotation of the fan 52 in the direction in which the outside air is taken into the storage portion 35 through the radiator grille 35g. After that, the ECU 41 executes the drive control of the fan 52 in FIG. 3 until the operation of the fuel cell system is completed.

In step S10, the ECU 41 determines whether the leakage of the fuel gas in the storage portion 35 is detected. The ECU 41 detects the leakage of the fuel gas, for example, when the concentration of the fuel gas detected by the fuel gas concentration sensor 35d shown in FIG. 2A becomes larger than the predetermined threshold value. Note that in other embodiments, the ECU 41 may detect the leakage of the fuel gas by a method other than the method using the fuel gas concentration sensor 35d. For example, the ECU 41 may detect the leakage of the fuel gas when a measured value of the supply pressure of the fuel gas to the fuel cell unit 30 falls below a target value of the supply pressure of the fuel gas by a predetermined threshold value. When the leakage of the fuel gas is not detected in step S10, the ECU 41 continues to monitor the leakage of the fuel gas in the storage portion 35.

When the leakage of the fuel gas is detected in step S10, the ECU 41 reverses the rotation direction of the fan 52 in step S20 so that air in the storage portion 35 is discharged to the outside through the radiator grille 35g. This can suppress the fuel gas that has leaked in the storage portion 35 from staying in the storage portion 35. In step S20, as described in the first embodiment, the ECU 41 may notify the occupant of the occurrence of leakage of the fuel gas through the notification unit (not shown).

The ECU 41 determines in step S30 whether the leakage of the fuel gas in the storage portion 35 has been eliminated. The ECU 41 detects elimination of the leakage of the fuel gas in the storage portion 35 when the concentration of the fuel gas in the storage portion 35 falls below a predetermined allowable value. The ECU 41 continues the rotation of the fan 52 in the direction in which air in the storage portion 35 is discharged to the outside until the elimination of the leakage of the fuel gas is detected.

When the elimination of the leakage of the fuel gas is detected in step S30, the ECU 41 reverses the rotation direction of the fan 52 in step S40 to return the rotation direction of the fan 52 to the normal rotation direction. As a result, the rotation direction of the fan 52 is switched to the direction in which the outside air is taken into the storage portion 35. After that, the ECU 41 returns to the process of step S10 and continues the drive control of the fan 52 described above until the operation of the fuel cell system is stopped.

As described above, in the vehicle 10 of the second embodiment, for example, even when the fusion valve 34 has opened and the fuel gas is leaking in the storage portion 35, it is possible to use the fan 52 of the radiator 50 to promote discharge of the fuel gas from the storage portion 35. In addition, with the vehicle 10 of the second embodiment, various functions and effects similar to those described in the first embodiment can be obtained.

3. Third Embodiment

Figure 4:
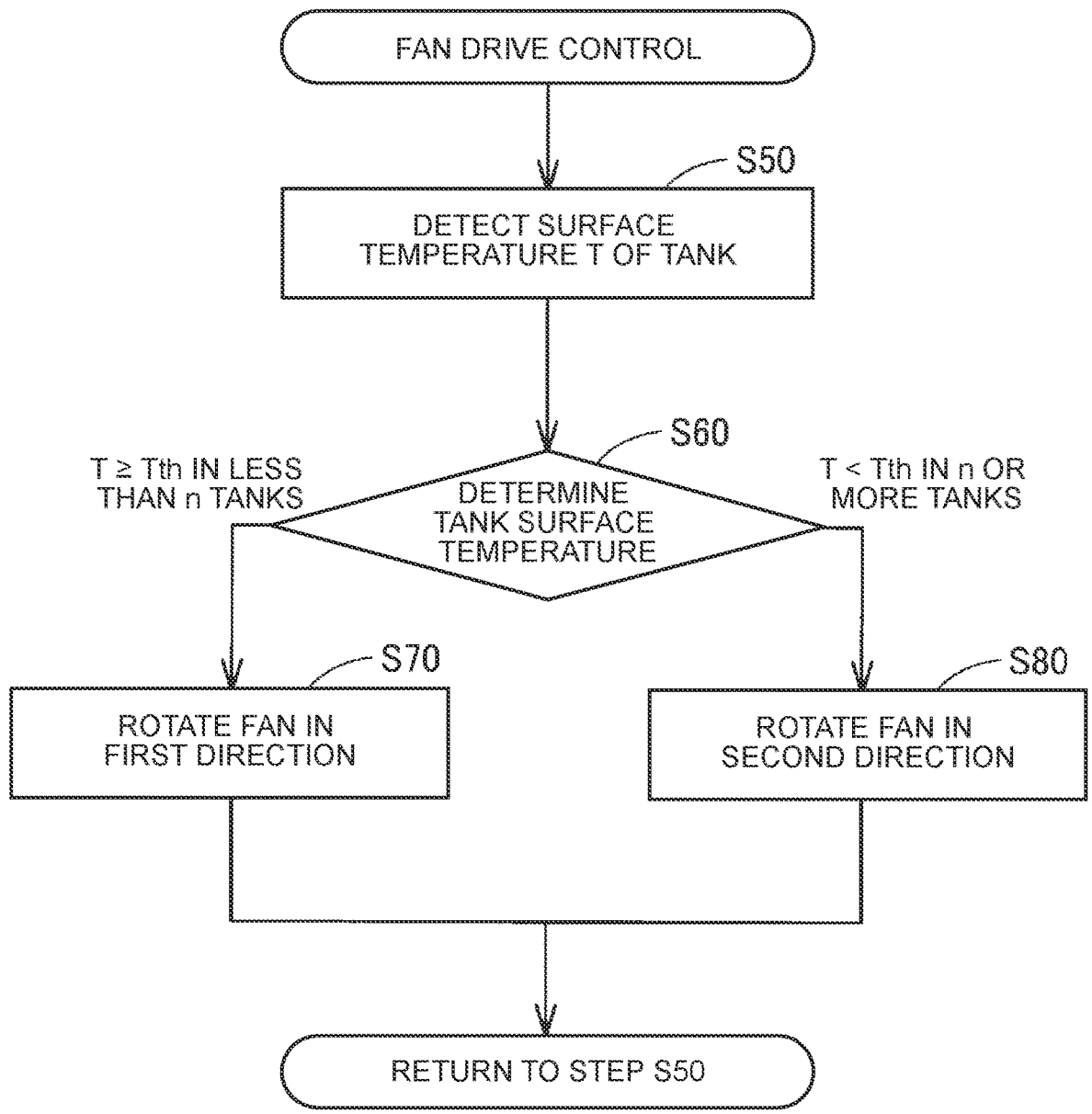
FIG. 4 is a flowchart illustrating a flow of drive control for the fan in a third embodiment.

FIG. 4 is a flow chart illustrating a flow of drive control of the fan 52 of the radiator 50, which is executed in the vehicle 10 of a third embodiment. Hereinafter, the configuration of the vehicle 10 of the third embodiment is substantially the same as that described in the first embodiment unless otherwise specified. When the operation of the fuel cell system is started, the ECU 41 controls the drive motor 53 to start the rotation of the fan 52 in the direction in which the outside air is taken into the storage portion 35, and executes the drive control of FIG. 4 over the period of operation of the fuel cell system.

In step S50, the ECU 41 detects a surface temperature T of each tank 32 with the temperature sensor 32t. In step S60, the ECU 41 executes a tank temperature determination process using the detection result of step S50. The ECU 41 determines whether the surface temperature T of each tank 32 is equal to or higher than a threshold temperature Tth. The threshold temperature Tth may be room temperature, for example. When the vehicle 10 has an outside air temperature sensor, the threshold temperature Tth may be set to the current outside air temperature measured by the outside air temperature sensor.

When the surface temperature T of less than n tanks 32 among the tanks 32 stored in the storage portion 35 is equal to or higher than the threshold temperature Tth, the ECU 41 rotates the fan 52 in a rotation direction along a first direction in step S70. The character n is a number of 1 or more determined in advance. Further, the rotation direction along the first direction is the direction in which the outside air is taken into the storage portion 35. Thereby, for example, when the surface temperature of the tanks 32 is high immediately after being filled with the fuel gas, the driving of the fan 52 can promote the introduction of the outside air into the storage portion 35 so that the cooling of the tanks 32 is also promoted. Thus, deterioration of the tanks 32 due to a rise in temperature can be suppressed.

When the surface temperature T of n or more of the tanks 32, among the tanks 32 stored in the storage portion 35, is lower than the threshold temperature Tth, the ECU 41 rotates the fan 52 in a rotation direction along a second direction in step S80. The rotation direction along the second direction is a reverse rotation direction with respect to the first direction, and is a direction in which the air in the storage portion 35 is discharged to the outside. As a result, the coolant flowing through the radiator 50 can be cooled using the air in the storage portion 35 with its temperature lowered by the tanks 32 having the surface temperature T lowered due to the discharge of the fuel gas. Thus, the cooling efficiency of the coolant in the radiator 50 can be improved. After step S70 or step S80, the ECU 41 repeats the process from step S50 and the subsequent steps.

As described above, in the vehicle 10 of the third embodiment, the rotation direction of the fan 52 is determined in accordance with the surface temperature T of the tanks 32. Thus, it is possible to suppress a rise in temperature of the tanks 32 and to improve the cooling efficiency of the coolant in the radiator 50. In addition, with the vehicle 10 of the third embodiment, various functions and effects similar to those described in the first embodiment can be obtained.

4. Fourth Embodiment

Figure 5:
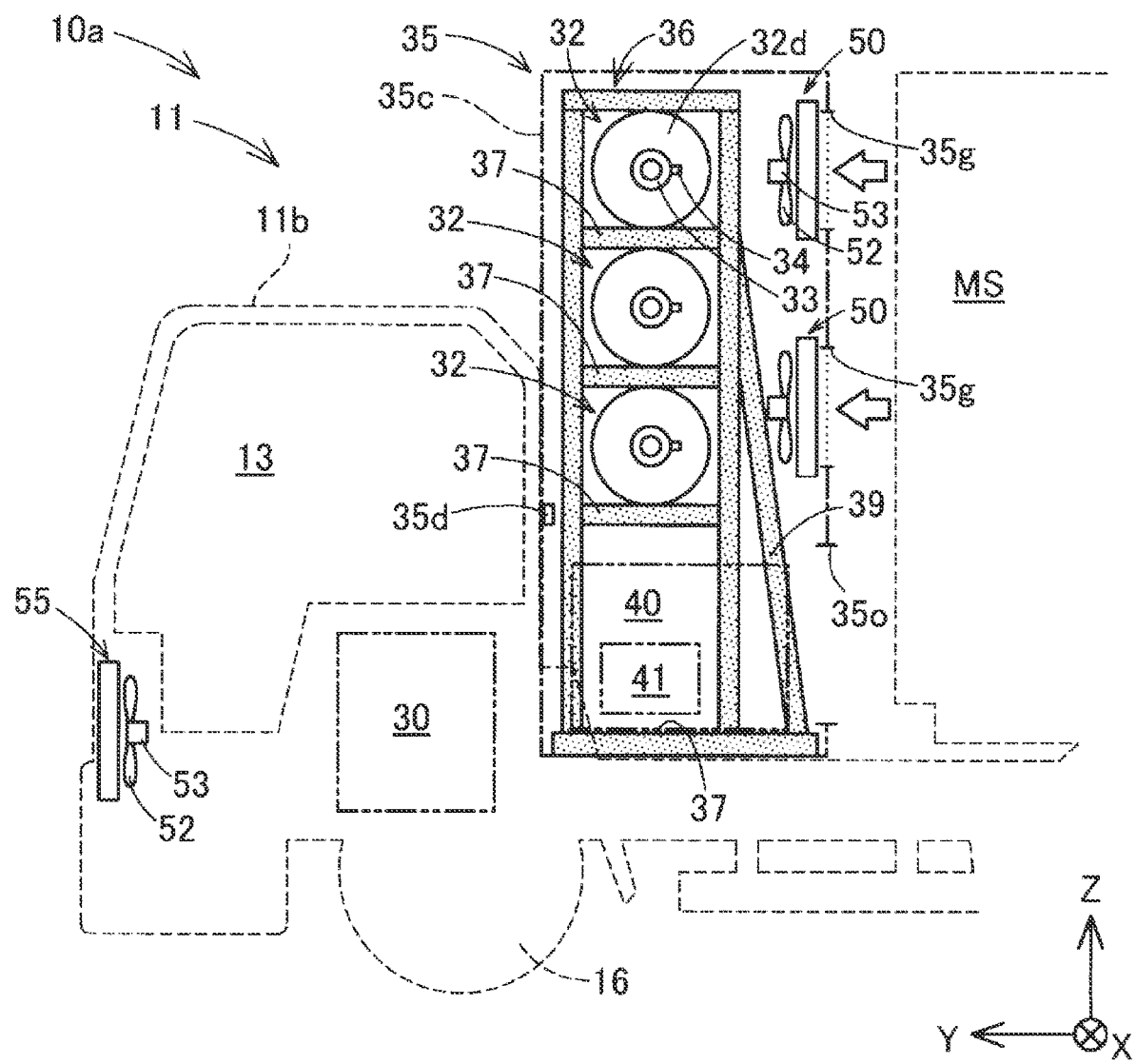
FIG. 5 is a schematic side view of the tractor head in a fourth embodiment.

FIG. 5 is a schematic side view showing a configuration of the tractor head 11 in a vehicle 10a of a fourth embodiment. FIG. 5 is almost the same as FIG. 2A, except that one more radiator 50 is provided to the storage portion 35. The configuration of the vehicle 10a of the fourth embodiment is almost the same as the configuration of the vehicle 10 of the first embodiment, except for the points described below. In the vehicle 10a of the fourth embodiment, the storage portion 35 is provided with two radiators 50. The two radiators 50 are arranged side by side in the height direction rearward of the tanks 32 so as to face the rear of the vehicle 10a. In the vehicle 10a, the number of the radiators 50 is increased, so that the heat exchange efficiency between air and the coolant is improved. In addition, with the vehicle 10a of the fourth embodiment, various functions and effects similar to those described in the above embodiments can be obtained. The number of radiators 50 is not limited to two. The storage portion 35 may be further provided with a plurality of radiators 50. Further, in other embodiments, the radiators 50 may be arranged side by side in the width direction of the vehicle 10a.

5. Fifth Embodiment

Figure 6:
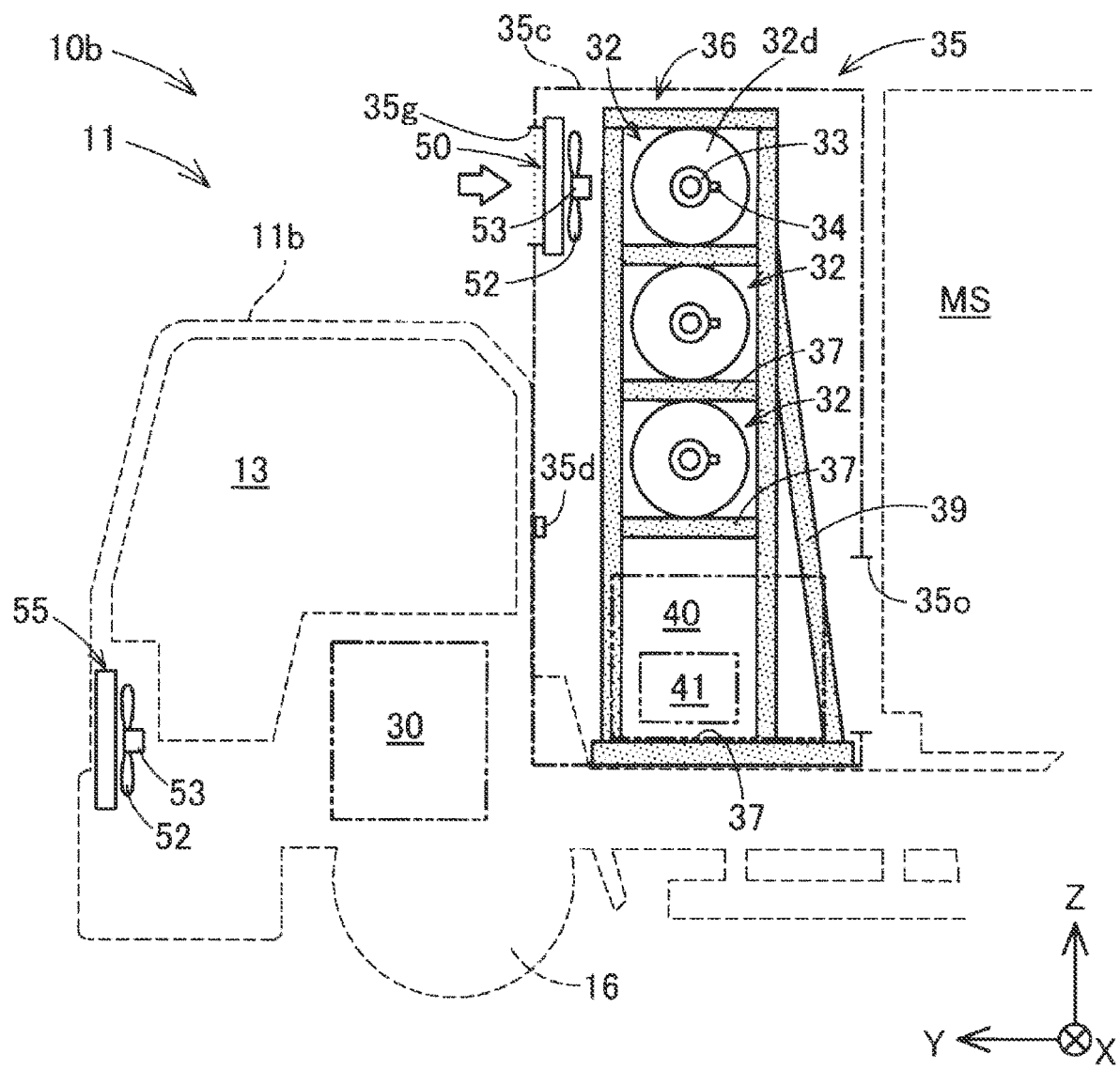
FIG. 6 is a schematic side view of the tractor head in a fifth embodiment.

FIG. 6 is a schematic side view showing a configuration of the tractor head 11 of a vehicle 10b according to a fifth embodiment. FIG. 6 is almost the same as FIG. 2A except that the installation position of the radiator 50 in the storage portion 35 is different. The configuration of the vehicle 10b of the fifth embodiment is substantially the same as the configuration of the vehicle 10 of the first embodiment, except for the points described below. In the vehicle 10b of the fifth embodiment, the radiator 50 of the storage portion 35 is installed forward of the tanks 32 so as to face the front of the vehicle 10b. Thereby, traveling wind from the front of the vehicle 10b can be more efficiently taken into the storage portion 35 through the radiator 50. In addition, with the vehicle 10b of the fifth embodiment, various functions and effects similar to those described in the above embodiments can be obtained.

6. Sixth Embodiment

Figure 7:
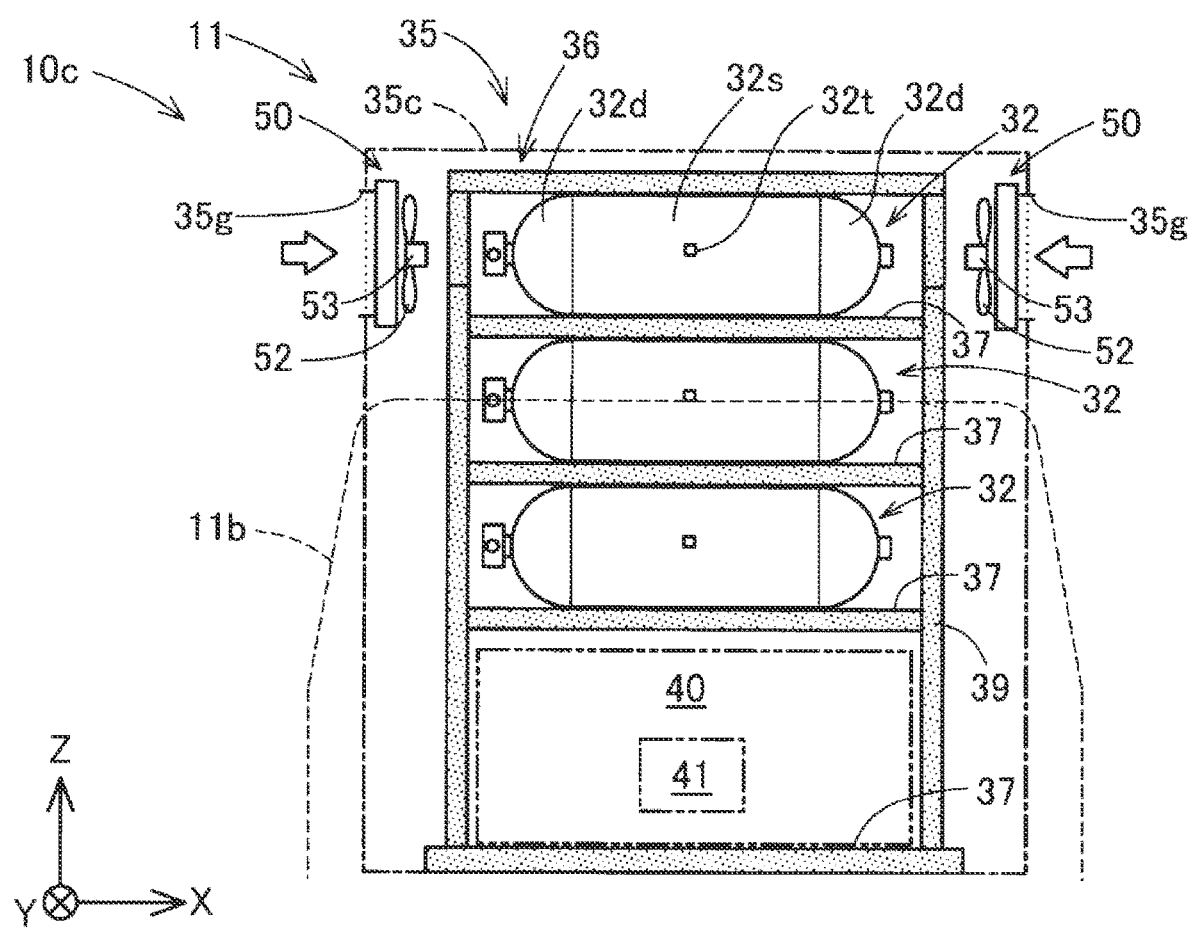
FIG. 7 is a schematic back side view of the tractor head in a sixth embodiment.

FIG. 7 is a schematic back side view showing a configuration of the tractor head 11 of a vehicle 10c according to a sixth embodiment. FIG. 7 is almost the same as FIG. 2B except that the installation positions of the radiators 50 in the storage portion 35 are different. The configuration of the vehicle 10c of the sixth embodiment is substantially the same as the configuration of the vehicle 10 of the first embodiment, except for the points described below. In the vehicle 10c of the sixth embodiment, the radiators 50 of the storage portion 35 are installed on the opposite sides of the tanks 32 in the width direction of the vehicle 10c so as to face the sides of the vehicle 10c. Thereby, traveling wind from the sides of the vehicle 10c can be more efficiently taken into the storage portion 35 through the radiators 50. The radiator 50 may be provided only on one side of the tanks 32. In other embodiments, the plurality of radiators 50 may be arranged on the side(s) of the tanks 32 side by side in the height direction or in the front-rear direction. In addition, with the vehicle 10c of the sixth embodiment, various functions and effects similar to those described in the above embodiments can be obtained.

7. Seventh Embodiment

Figure 8:
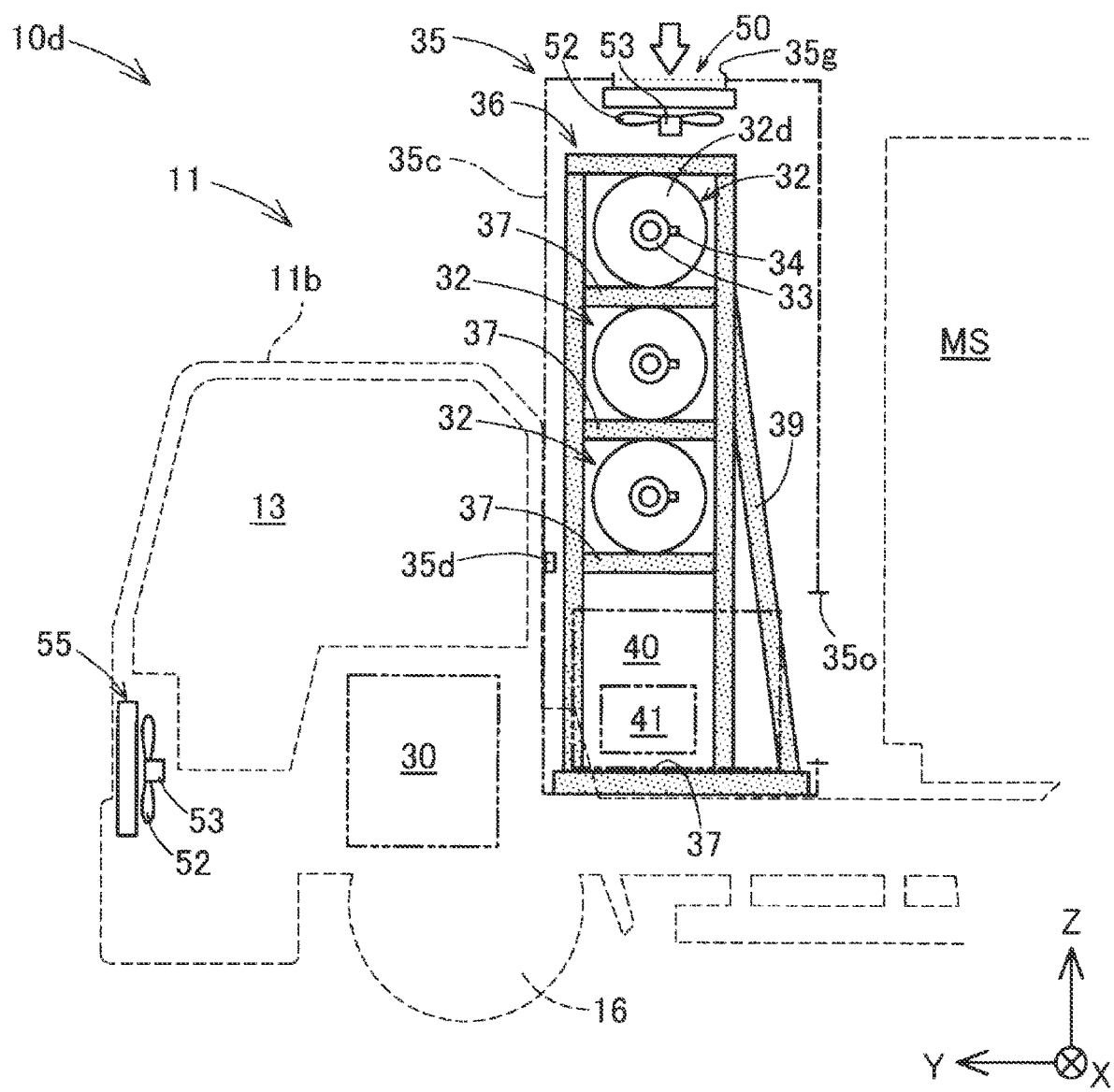
FIG. 8 is a schematic side view of the tractor head in a seventh embodiment.

FIG. 8 is a schematic side view showing a configuration of the tractor head 11 of a vehicle 10d according to a seventh embodiment. FIG. 8 is almost the same as FIG. 2A except that the installation position of the radiator 50 in the storage portion 35 is different. The configuration of the vehicle 10d of the seventh embodiment is substantially the same as the configuration of the vehicle 10 of the first embodiment except for the points described below. In the vehicle 10d of the seventh embodiment, the radiator 50 of the storage portion 35 is installed above the tanks 32 so as to face upward. Thereby, traveling wind from above the vehicle 10d can be more efficiently taken into the storage portion 35 through the radiator 50. In other embodiments, the plurality of radiators 50 may be arranged above the tanks 32 side by side in the front-rear direction or in the width direction of the vehicle 10. In addition, with the vehicle 10d of the seventh embodiment, various functions and effects similar to those described in the above embodiments can be obtained.

8. Eighth Embodiment

Figure 9A:
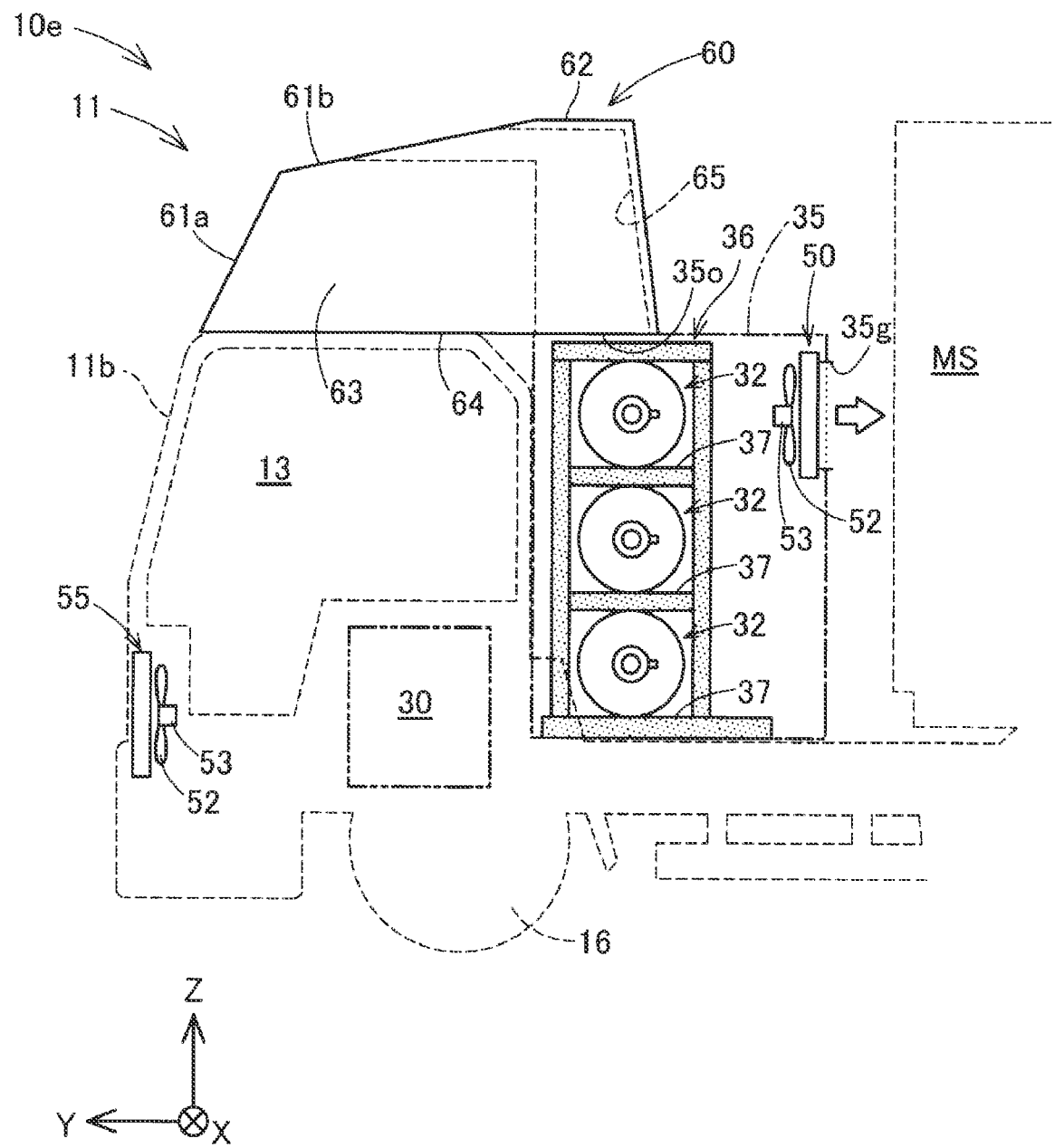
FIG. 9A is a schematic side view of the tractor head in an eighth embodiment.
Figure 9B:
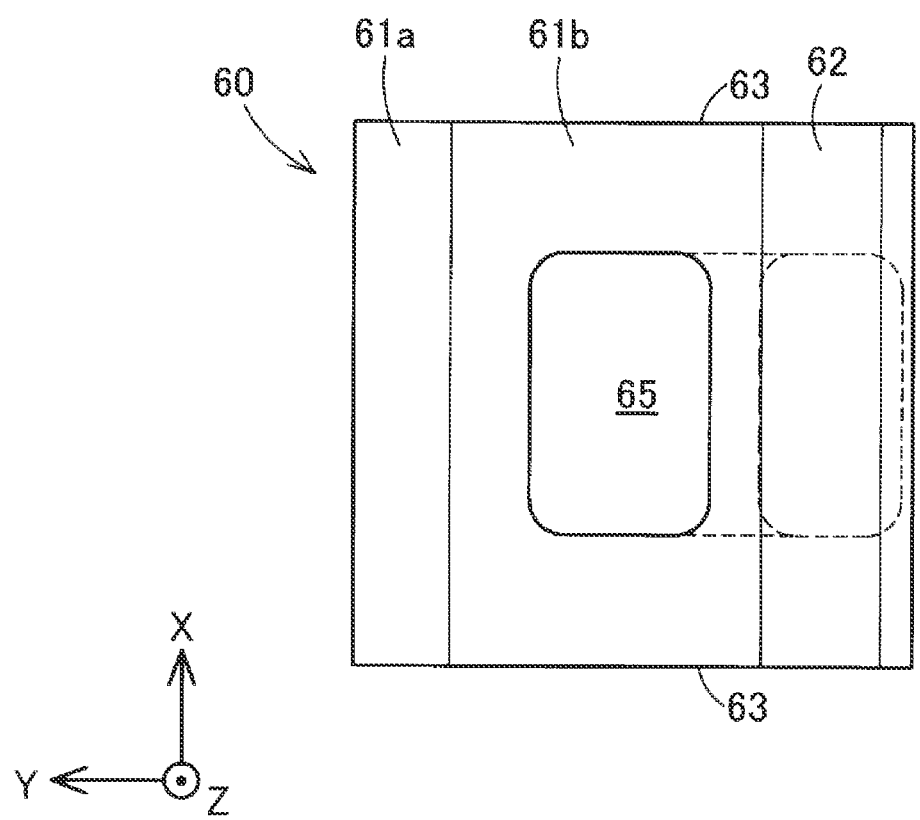
FIG. 9B is a schematic plan view showing an air guide portion of the eighth embodiment.

FIG. 9A is a schematic side view showing a configuration of the tractor head 11 of a vehicle 10e according to an eighth embodiment. FIG. 9A is substantially the same as FIG. 5 except that an air guide portion 60 described below is provided and the storage portion 35 is downsized in the height direction. FIG. 9B is a schematic plan view of the air guide portion 60 seen downwardly from above. The configuration of the vehicle 10e of the eighth embodiment is almost the same as the configuration of the vehicle 10a of the fourth embodiment shown in FIG. 5, except for the points described below.

With reference to FIG. 9A, in the vehicle 10e of the eighth embodiment, the system auxiliary equipment 40 is disposed in a portion other than the storage portion 35, and in the storage portion 35, the space for installing the system auxiliary equipment 40 is omitted, and the dimension of the storage portion 35 in the height direction is reduced. In the eighth embodiment, the upper surface of the storage portion 35 is substantially flush with the upper surface of the main body 11b.

As shown in FIG. 9A, the vehicle 10e is provided with the air guide portion 60 extending from the upper surface of the main body 11b to the upper surface of the storage portion 35. The air guide portion 60 constitutes a part of the body of the tractor head 11. The air guide portion 60 is configured as a hollow box, and is made of, for example, ABS resin or fiber reinforced plastic.

With reference to FIG. 9A and FIG. 9B, the air guide portion 60 has two inclined surfaces 61a, 61b that are continuously arranged in the front-rear direction and inclined downward toward the front, and an upper surface 62 that is located rearward of the two inclined surfaces 61a, 61b so as to face upward. In addition, the air guide portion 60 has a pair of side surfaces 63 intersecting with the inclined surfaces 61a, 61b and the upper surface 62, and facing each other in the width direction of the vehicle 10e, and a bottom surface 64 intersecting with the front inclined surface 61a and the side surfaces 63 and facing downward.

As shown in FIG. 9A, the front inclined surface 61a is disposed at a position adjacent to the front surface of the main body 11b. The rear inclined surface 61b is located between the front inclined surface 61a and the upper surface 62. The rear inclined surface 61b has a smaller inclination angle with respect to the front-rear direction of the vehicle 10e than the front inclined surface 61a. With the inclined surfaces 61a, 61b, traveling wind that collides with the front surface of the tractor head 11 to flow upward is guided rearward. The front inclined surface 61a and the rear inclined surface 61b may be integrated so as to form a smooth curve when viewed in the X direction. Further, an inclined surface having a different inclination angle with respect to the front-rear direction may be added between the front inclined surface 61a and the rear inclined surface 61b.

The air guide portion 60 has an air flow path 65 provided therein for guiding traveling wind into the storage portion 35. One end of the air flow path 65 is open at the rear inclined surface 61b, and the other end is open at the bottom surface 64. An opening of the air flow path 65 on the bottom surface 64 side is connected to an opening 35o provided in the upper surface of the housing 35c of the storage portion 35. With the air guide portion 60 having the air flow path 65, traveling wind can be efficiently introduced into the storage portion 35.

In the vehicle 10e of the eighth embodiment, the fan 52 of the radiator 50 provided in the storage portion 35 rotates in the direction in which the air in the storage portion 35 is discharged to the outside. In addition, as described above, traveling wind is guided into the storage portion 35 through the air guide portion 60. Thus, the heat exchange efficiency between air and the coolant in the radiator 50 can be improved. Further, even when a leakage of the fuel gas occurs in the storage portion 35, traveling air that is taken into the storage portion 35 through the air guide portion 60 promotes the discharge of the fuel gas from the storage portion 35. In addition, with the vehicle 10e of the eighth embodiment, various functions and effects similar to those described in the above embodiments can be obtained.

9. Ninth Embodiment

Figure 10:
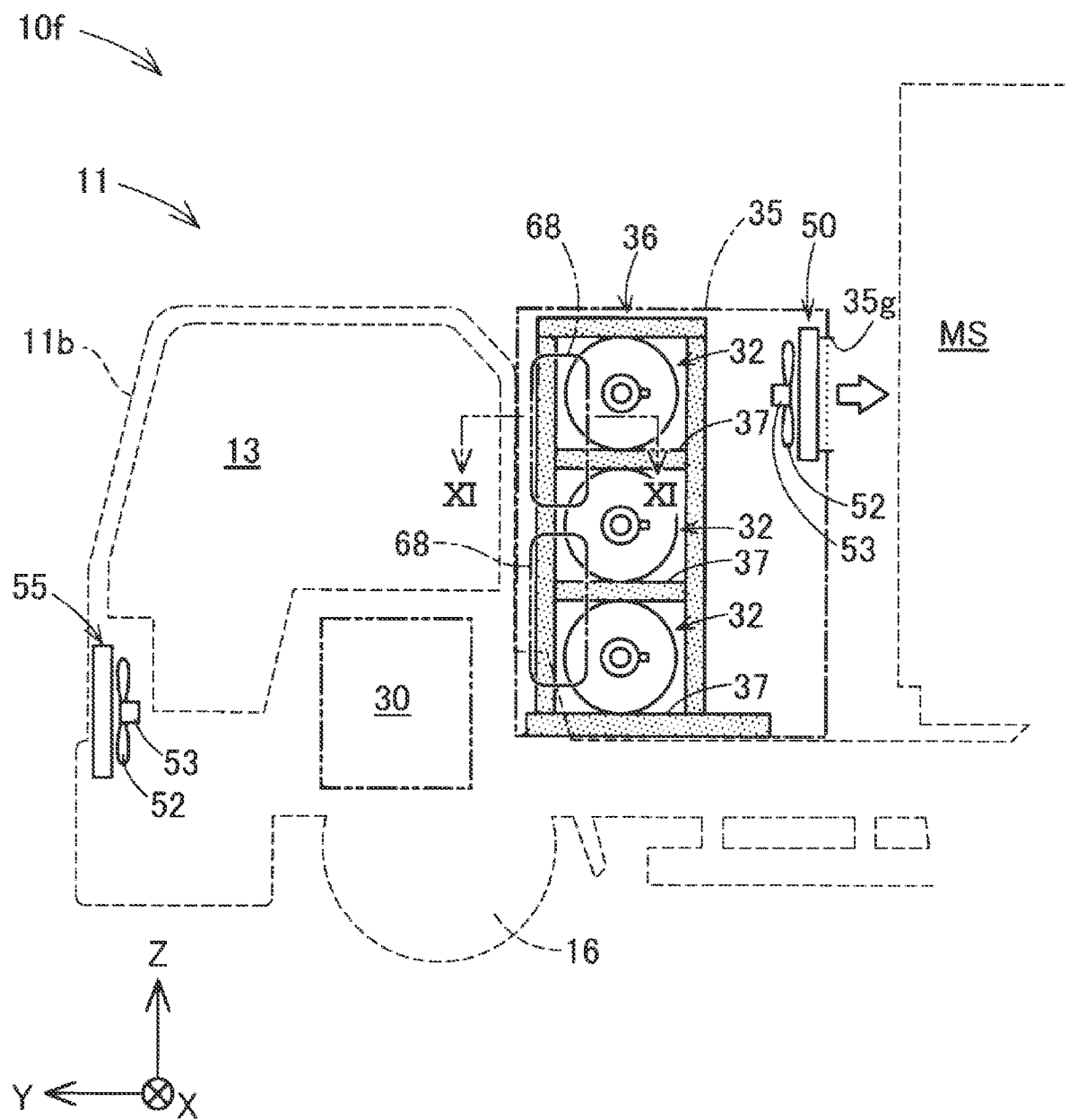
FIG. 10 is a schematic side view of the tractor head in a ninth embodiment.

FIG. 10 is a schematic side view showing a configuration of the tractor head 11 of a vehicle 10f according to a ninth embodiment. FIG. 10 is substantially the same as FIG. 9A except that the air guide portion 60 is not provided and air guide ports 68 provided in the housing 35c of the storage portion 35 are shown by long dashed short dashed lines. The configuration of the vehicle 10f of the ninth embodiment is substantially the same as the configuration of the vehicle 10e of the eighth embodiment, except for the points described below.

The vehicle 10f of the ninth embodiment does not include the air guide portion 60, and instead, the housing 35c of the storage portion 35 is provided with the air guide ports 68 for taking traveling wind into the housing 35c. The air guide ports 68 are provided in both side surfaces of the housing 35c. The air guide ports 68 may be provided in only one side surface of the housing 35c. In other embodiments, the air guide ports 68 may be provided in the upper surface of the housing 35c.

Figure 11:
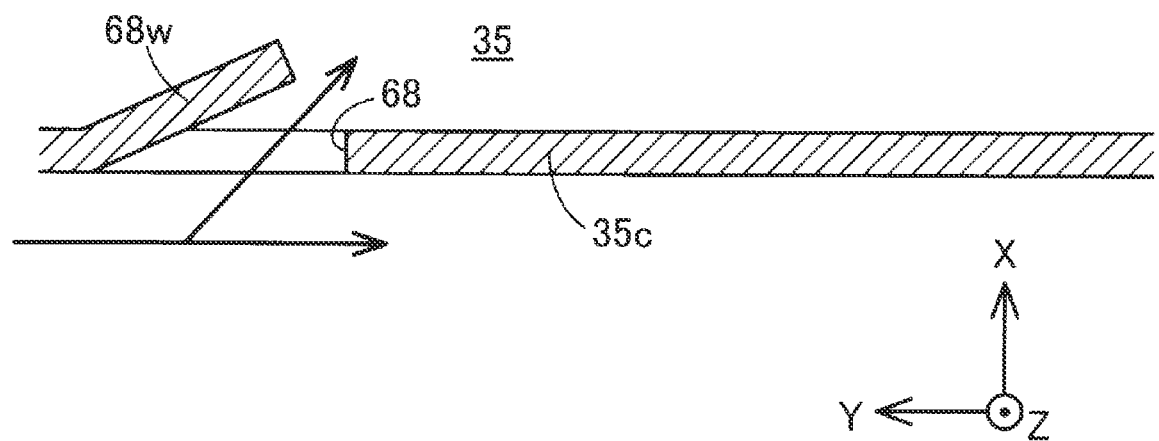
FIG. 11 is a schematic sectional view showing a configuration of an air guide port of the ninth embodiment.

The configuration of each air guide port 68 will be described in detail with reference to FIG. 11. FIG. 11 is a schematic sectional view taken along line XI-XI shown in FIG. 10. A guide wall 68w that is bent and inclined toward the inside of the storage portion 35 is provided at a front end portion of the air guide port 68. The guide wall 68w is inclined with respect to the front-rear direction of the vehicle 10e so that a part of the guide wall 68w more toward the rear is located more inward in the storage portion 35. With the guide wall 68w, traveling wind flowing on the sides of the storage portion 35 while the vehicle 10e is moving forward easily flows into the storage portion 35.

In the vehicle 10f of the ninth embodiment, traveling wind can be efficiently taken into the storage portion 35 through the air guide ports 68 provided in the housing 35c of the storage portion 35. Thus, the heat exchange efficiency between air and the coolant in the radiator 50 provided in the storage portion 35 can be improved. Further, the discharge of the fuel gas from the storage portion 35 that has leaked in the storage portion 35 is promoted. In addition, with the vehicle 10f of the ninth embodiment, various functions and effects similar to those described in the above embodiments can be obtained.

10. Other Embodiments

The various configurations described in the above embodiments can be modified as follows, for example. Each of the other embodiments described below are regarded as an example of modes for carrying out the technique of the present disclosure, like the above-described embodiments.

Other Embodiment 1

In each of the above-described embodiments, the installation posture of the tanks 32 in the storage portion 35 is not limited to such a posture that the longitudinal direction thereof coincides with the width direction of the vehicle. The tanks 32 may be arranged, for example, so that the longitudinal direction thereof coincides with the height direction of the vehicle. The storage shelf 36 in the storage portion 35 may be omitted, and the tanks 32 may be fixed to an inner wall surface of the housing 35c in the storage portion 35.

Other Embodiment 2

In each of the above embodiments, the vehicles 10, 10a to 10f are not limited to freight vehicles including the tractor head 11. The vehicles 10, 10a to 10f may be configured, for example, as a truck in which a cargo bed or a cargo room constituting the loading space MS is always fixed to the rear of the vehicle cabin 13. In each of the above embodiments, the vehicles 10, 10a to 10f need not to use electric power generated by the fuel cell unit 30 for traveling, and may use the electric power only for driving electrical components or only for external charging.

Other Embodiment 3

The configurations of the above-described embodiments can be appropriately combined. For example, in the configuration of the first embodiment, the radiator 50 located forward of the tanks 32 described in the fifth embodiment, the radiators 50 on the side(s) of the tanks 32 described in the sixth embodiment, and/or the radiator 50 above the tanks 32 described in the seventh embodiment may be added. Similarly, in each of the configurations of the fifth embodiment, the sixth embodiment, and the seventh embodiment, the positions of the radiators 50 described in the other embodiments may be appropriately combined. In addition, in each of the embodiments other than the eighth embodiment, the air guide portion 60 of the eighth embodiment may be added, and in each of the embodiments other than the ninth embodiment, the air guide ports 68 of the ninth embodiment may be added. In addition, in the freight vehicle of each of the above embodiments, the drive control of the fan 52 of the radiator 50 in the second embodiment or the drive control of the fan 52 of the radiator 50 in the third embodiment may be performed. The drive control of the fan 52 of the radiator 50 in the second embodiment and the drive control of the fan 52 of the radiator 50 in the third embodiment may be performed in parallel. In this case, for example, the drive control of the fan 52 when the leakage of the fuel gas is detected in the storage portion 35 may be set to be prioritized over the drive control of the fan 52 based on the surface temperature of the tanks 32.

11. Others

The disclosure is not limited to the above-described embodiments, and can be implemented with various configurations without departing from the scope of the disclosure. For example, the technical features in the embodiments, examples, and modifications corresponding to the technical features in the aspects described in the SUMMARY may be appropriately replaced or combined in order to solve part of or all of the above-mentioned issues or in order to achieve part of or all of the above-mentioned effects. Further, not only the technical features that are described as non-essential but also other technical features may be appropriately omitted unless described as essential in the specification.

What is claimed is:

1. A freight vehicle having a loading space, on which freight is loaded, rearward of a vehicle cabin in which an occupant rides, the freight vehicle comprising:
    a fuel cell mounted below the vehicle cabin and functioning as an electric power source;
    a storage portion disposed between the vehicle cabin and the loading space,
    a tank disposed in the storage portion and configured to store a fuel gas that is supplied to the fuel cell, and
    a radiator installed in the storage portion and configured to perform heat exchange between air and a coolant that is supplied to the fuel cell,
    wherein the radiator is provided rearward of the tank.

2. The freight vehicle according to claim 1, further comprising a leakage detection unit configured to detect a leakage of the fuel gas from the tank,
    wherein the radiator has a fan that is configured to be rotated by a drive motor to control circulation of air between an inside and an outside of the storage portion, and
    the fan is configured to, when the leakage of the fuel gas is not detected by the leakage detection unit, rotate such that air is taken from the outside of the storage portion to the inside of the storage portion, and is configured to, when the leakage of the fuel gas is detected by the leakage detection unit, rotate such that air is discharged from the inside of the storage portion to the outside of the storage portion.

3. The freight vehicle according to claim 1, further comprising a temperature sensor configured to detect a surface temperature of the tank,
    wherein the radiator has a fan that is configured to be rotated by a drive motor to control circulation of air between an inside and an outside of the storage portion, and
    the fan is configured to, when the surface temperature of the tank that is detected by the temperature sensor is equal to or higher than a predetermined threshold temperature, rotate such that air is taken from the outside of the storage portion to the inside of the storage portion, and is configured to, when the surface temperature of the tank is lower than the threshold temperature, rotate such that air is discharged from the inside of the storage portion to the outside of the storage portion.

* * * * *